United States Patent [19]

Buffington

[11] 4,410,807
[45] Oct. 18, 1983

[54] REGULATING DEVICE FOR POLYPHASE ELECTRICAL CIRCUITS

[75] Inventor: James F. Buffington, Plymouth, Ind.

[73] Assignee: Kay Industries, Inc., Plymouth, Ind.

[21] Appl. No.: 362,256

[22] Filed: Mar. 26, 1982

[51] Int. Cl.³ .............................................. H02J 9/00
[52] U.S. Cl. ..................................... 307/68; 323/204; 323/207; 323/299; 363/150
[58] Field of Search .................. 307/68; 318/438, 486; 323/204, 207, 209, 210, 232, 233, 299; 363/149, 150

[56] References Cited

U.S. PATENT DOCUMENTS

| | | |
|---|---|---|
| 641,903 | 1/1900 | Steinmetz . |
| 3,349,316 | 10/1967 | Buffington ........................ 363/149 |
| 3,387,202 | 6/1968 | Buffington . |
| 3,670,238 | 6/1972 | Ronk . |
| 4,079,446 | 3/1978 | Hertz . |
| 4,158,225 | 6/1979 | Hertz . |
| 4,249,237 | 2/1981 | Ronk et al. . |

FOREIGN PATENT DOCUMENTS

| | | | |
|---|---|---|---|
| 673856 | 6/1966 | Belgium ...................... | 260/239.3 B |
| 12401 | 1/1980 | European Pat. Off. ............ | 564/194 |
| 26640 | 4/1981 | European Pat. Off. ............ | 548/550 |
| 46291 | 2/1982 | European Pat. Off. ..... | 260/239.3 B |
| 61187 | 9/1982 | European Pat. Off. ..... | 260/239.3 B |
| 2714442 | 10/1977 | Fed. Rep. of Germany ... | 260/239.3 B |
| 49-28753 | 7/1974 | Japan ........................... | 260/239.3 B |
| 49-28754 | 7/1974 | Japan ........................... | 260/239.3 B |
| 1305278 | 1/1973 | United Kingdom ......... | 260/239.3 B |
| 2095252 | 9/1982 | United Kingdom ............... | 546/147 |

OTHER PUBLICATIONS

Australian J. Chem., vol. 33, 633 (1980).
Japan 74-028753, 7/29/1974, CA 82, 139978m (1975).
Japn 74-028754, 7/29/1974, CA 82, 139981g (1975).
Paquette et al., J. Organic Chemistry, vol. 34, pp. 2879–2880, (1969).
Smith et al., J. Medicinal Chemistry, vol. 24, pp. 104–109, (1981).
Patchett et al., Nature, vol. 288, pp. 280–283, (1980).
J. Org. Chem., vol. 34, 2879 (1969).
J. Med. Chem., vol. 24, 104 (1981).
Nature, vol. 288, 280 (1980).

*Primary Examiner*—William M. Shoop
*Attorney, Agent, or Firm*—Marmaduke A. Hobbs

[57] ABSTRACT

A regulating device for a polyphase electrical circuit, having a motor with windings corresponding to the main supply lines for the circuit. Leads are connected to each of the windings and contain a relatively low m.f.d. capacitor for suppressing spikes and similar transients in the respective supply lines, and a relatively high m.f.d. capacitor for functioning as a phase converter in the event the current in the respective supply line is interrupted. By-pass circuits are provided for each of the low m.f.d. capacitors corresponding to a respective supply line, containing relay means in the circuit responsive to the supply line to by-pass the low m.f.d. capacitor in the event the current is interrupted in the respective supply line, thereby permitting the high m.f.d. capacitor to function as part of a phase converter. In a modification of the present system, in some installations the device may consist essentially of the pilot motor with leads connected parallel to the respective windings and each capacitor therein of a sufficiently high m.f.d. rating to cause the said device to operate as a phase converter in the event the current in any one of the lines is interrupted.

12 Claims, 4 Drawing Figures

REGULATING DEVICE FOR POLYPHASE ELECTRICAL CIRCUITS

BACKGROUND OF THE INVENTION

Polyphase electrical systems are used extensively in many types of industries, and three phase systems have become commonplace. There are many advantages to the use of polyphase electrical equipment, including the elimination of pulsation inherently present in single phase electrical operation. Large machines operating on single phase may pulsate objectionably, leading to excessive vibration. Polyphase current provides a constant power level if the phases are properly balanced. Polyphase operation minimizes eddy currents in field windings of electrical apparatus and therefore reduces head build-up in the apparatus, and the polyphase machines operate more efficiently and economically, in that for a given frame size, the output of a polyphase machine is greater than the output of a single phase machine.

For these and other reasons, many large manufacturing machines, television and radio transmitters, and computers are often operated on three phase current, which is usually supplied from the electrical utility serving the establishment. In some situations, the cost of extending three phase current to the location of the equipment may not justify the savings obtained in operating the three phase current. Further, if an outage occurs in one or two of the supply lines of a three phase source, serious complications can arise. For example, some types of knitting and weaving machines used in the fabric industry operate on three phase current. If a phase is lost, or if fluctuations in the current are present, the machines may either stop or slow down, resulting in desynchronization of operation. When this occurs, the machine jams, and though a power outage may be only for an instant, the time required to clear and restart the machine can result in substantial downtime of the machine. For television and radio transmitters, a phase outage of several seconds may result in a broadcast outage of several minutes, and in the operation of computers, a phase outage can result in the clearing of an established short-time memory in the computer. These and other types of problems can occur when a phase outage of seconds occurs, and if the phase outage persists, motor burnout and other serious mechanical damage can result.

Devices have been produced which will provide power for a given number of cycles if one or more phases are lost; however, these devices are only a temporary back-up, and have been used primarily for computers so that a short phase loss of perhaps 50 to 500 cycles will not cause an erasure of the temporary memory of the computer. Other types of back-up and/or warning systems have been used in which the phases are monitored and a relay or other means is provided for each, so that if a phase drops, only a minor interruption occurs. Warning devices are available which by alarm or light indicate the loss of a phase so that equipment can be shut down before damage thereto occurs; however, none of the previous devices could provide an extended back-up to continue a three phase current supply uninterrupted if one or two phases experienced outages.

In the operation of various systems of the foregoing types, other transient malfunctions sometimes occur which in some instances have only minor effect on the operation or performance, but which in other instances may cause serious problems or result in unsatisfactory operation of the system. In the electrical supply for the system, spikes and other transients may occur which prevent the equipment or systems from operating at maximum efficiency or providing optimum performance.

SUMMARY OF THE INVENTION

It is therefore one of the principal objects of the present invention to provide a regulating device for use with polyphase electrical circuit systems, which will maintain the electrical supply of the prescribed number of phases if one or more phases of the polyphase source continue, and which stabilizes and/or corrects the power factor and eliminates spikes and other transients from the power supply. Another object of the invention is to provide a polyphase regulating device or system which can continue to provide the required power supply for systems of the aforesaid types until corrections and/or repairs can be made, and which has phase conversion and/or transient elimination capabilities.

The present invention for accomplishing the foregoing objects and advantages relates to a device or system for use with a standard three phase electrical power supply, and one embodiment includes a pilot motor driven from the three phase power supply and provided with a capacitor for each phase functioning as a phase converter, to supply the required current in the event the supply is interrupted in any one of the phase circuits. The pilot motor runs idle when the main electrical supply system is operating normally, and these capacitors or other capacitors in parallel with the three phase windings of the motor minimize or eliminate the aforementioned transients. When capacitors other than those used for operating in the phase converter system are utilized, they have a relatively low voltage rating, since they can effectively perform the elimination of transients without consuming any appreciable amount of current; however, they do not have sufficient voltage capacity to perform effectively as phase converters. The present device or system in one form includes high and low microfarad rated capacitors in series, and circuits having a potential relay or the like responsive to the loss of current of any one of the three phases in the main supply lines are used for by-passing the low rated capacitor and permitting the high rated capacitor to compensate for the lost phase current. The pilot motor operates to provide a balanced and stable phase relationship between the three phases of the electrical system during the phase loss period.

DESCRIPTION OF THE PREFERRED EMBODIMENT

Figure 1:
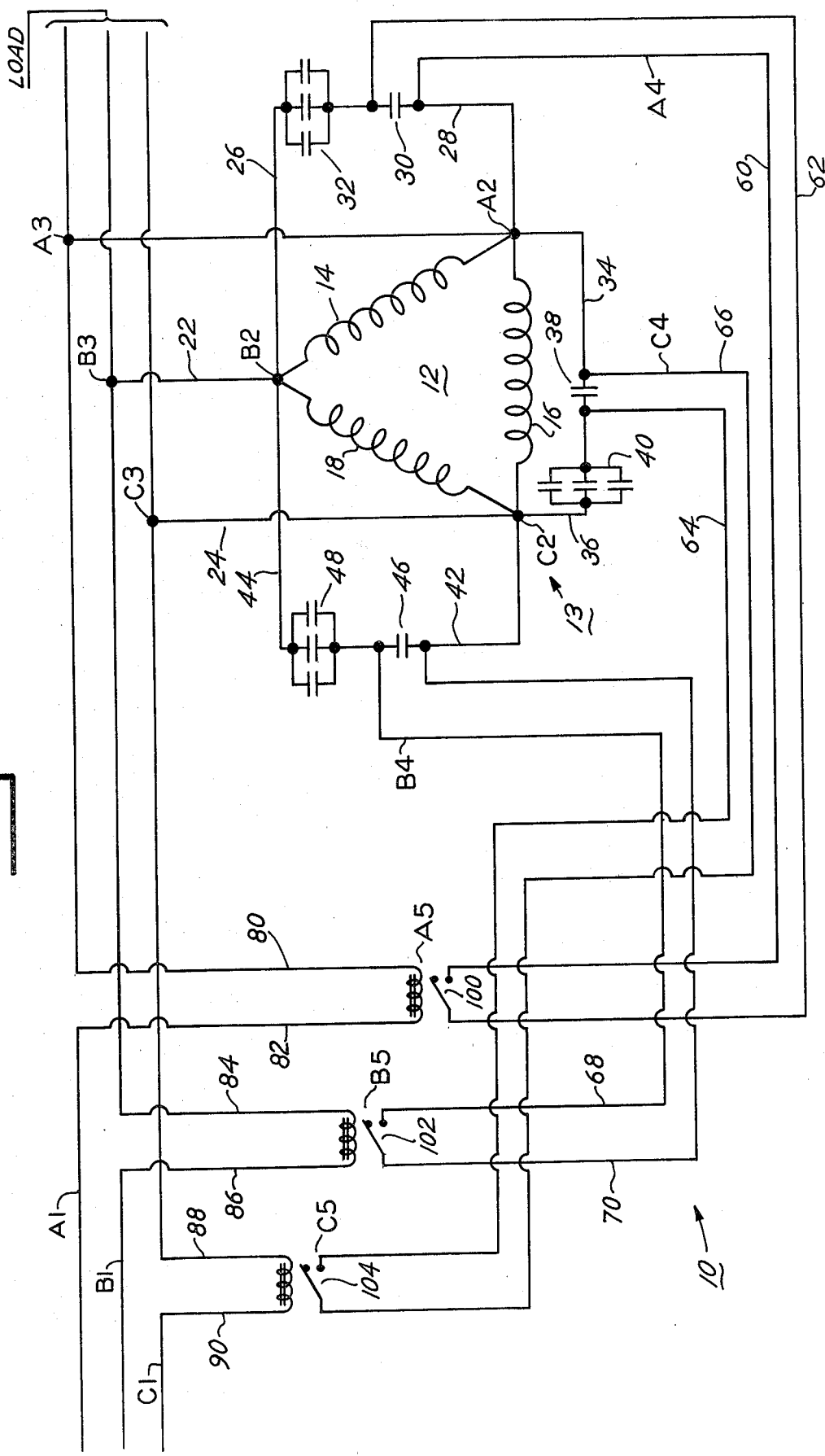
FIG. 1 is a schematic diagram of the complete device or system embodying the present invention, showing the parts and elements thereof in the position when the system is functioning normally.

Referring more specifically to the drawings, and to FIG. 1 in particular, numeral 10 indicates generally the present regulating device for a three phase electrical circuit, letter A1 indicating one line of the three phase supply system, B1 the second line of the system and C1 the third line of the system. A pilot motor 12 of assembly 13 is shown schematically with three coils 14, 16, and 18, delta connected, although they may be wye connected if desired. The coils are normally field windings; however, they may be rotary windings. Since this is a schematic view of the system, the details of the various components comprising the system are being shown only in the form of symbols, and hence will not be described in detail herein.

The windings 14 and 16 are connected together at the motor terminal A2, which in turn is connected to line A1 at A3, and windings 14 and 18 are connected to the pilot motor terminal B2 which is connected to power line B1 by line 22 at B3, and windings 16 and 18 are connected together at terminal C2 and the terminal is connected to line C1 by line 24 at C3. Terminals A2 and B2 are connected by lines 26 and 28 and have a capacitor 30 of a relatively low microfarad (m.f.d.) value and a capacitor 32 of a relatively high microfarad (m.f.d.) value. Terminals A2 and C2 are connected by lines 34 and 36 and have therein relatively low m.f.d. capacitor 38 and high m.f.d. capacitor 40, and terminals B2 and C2 are connected by lines 42 and 44, having therein relatively low m.f.d. capacitor 46 and high m.f.d. capacitor 48. With the system thus far described, the three phase power supply system, when it is operating normally, operates essentially without the assistance of pilot motor 12, capacitors 30, 38 and 46 functioning primarily to minimize or eliminate spikes or other transients that may occur in the main power supply lines A1, B1, and C1, and capacitors 32, 40 and 48 perform no function in the circuitry, since in each of the lines in which those capacitors appear, the low m.f.d. capacitors 30, 38 and 46 are in series therewith, and hence determine the capacity in lines 26 and 28, 34 and 36 and 42 and 44. With only this part of the system, the pilot motor and low m.f.d. capacitors are incapable of functioning as a phase converter in the event any one of the phases of lines A1, B1 or C1 is lost.

In order to enable the circuitry thus far described to function as a phase converter, in addition to the control of transients and correction of the power factor, the low m.f.d. capacitors 30, 38, and 46 are by-passed or shorted by three circuits, capacitor 30 being shorted by lines 60 and 62 of circuit A4, capacitor 38 by lines 64 and 66 of circuit C4, and capacitor 46 by lines 68 and 70 of circuit B4. The three lines are all controlled by potential relays A5, C5 and B5, respectively. The three potential relays are of a type that senses the flow of current through lines A1, B1 and C1, without creating any resistance in the main supply lines. As shown in the drawings, line A1 is connected to relay A5 by leads 80 and 82, line B1 is connected to relay B5 by leads 84 and 86, and line C1 is connected to relay C5 by leads 88 and 90. Relays A5, B5 and C5 sense the flow of current through the respective lines A1, B1, and C1, and switches 100, 102, and 104 of relays A5, B5 and C5 are normally in open position, when the three supply lines A1, B1 and C1 are functioning normally, supplying the required three phase current to the load. However, when the current in any one of the three main supply lines is lost or otherwise interrupted, the respective switch 100, 102 or 104 closes, thereby shorting or by-passing the respective low m.f.d. capacitor 30, 38 or 46, and hence permitting the respective high m.f.d. capacitor 32, 40 or 48 to become operable, to provide the current phase corresponding to the current phase of the lost line of A1, B1 or C1. While these capacitors are referred to as high and low m.f.d. capacitors, they may be, for example, eight microfarads, for the low m.f.d. capacitors 30, 38 and 46, and twenty microfarads for the high m.f.d. capacitors 32, 40 and 48, for a one horse power motor 12. The size or value of the capacitors will vary in accordance with the horse power rating of motor 12 with which the capacitors are used. For example, a ten horse power motor 12 would use low m.f.d. capacitors of 80 microfarads and a high m.f.d. capacitor of 200 microfarads.

In the operation and use of the present regulating device for the three phase supply system, with main lines A1, B1 and C1 functioning normally and providing three phase current to the load, assembly 13 runs virtually with no load and performs merely the functions of minimizing or eliminating spikes and similar transients in lines A1, B1 and C1, and corrects the power factor to obtain optimum performance of the motor or other load operated by the three main lines. This is accomplished primarily by the three low m.f.d. capacitors, 30, 38 and 46. In the event the current is lost in one of the three main supply lines, for example in line C1, the potential relay C5 is de-energized, permitting switch 104 to close, thereby closing the circuit of lines 64 and 66 and by-passing or shorting the low m.f.d. capacitor 38. This permits high m.f.d. capacitor 40 to become effective and, along with the winding 16, provides the third phase current for line C1, thus re-establishing the three phase power supply to the load. This same type of operation will occur in the event the current is interrupted in any one of the three lines, in that loss of power in any one of the lines causes the respective relay to be de-energized, and the switch thereof to close and short the low m.f.d. capacitor and render the heavy m.f.d. capacitor effective to perform the phase converter function. The continued operation of motor 12 by the current from the other two supply lines produces a balanced relationship in the lines and stabilizes the phase produced by the activated high m.f.d. capacitor of the lost line.

Figure 2:
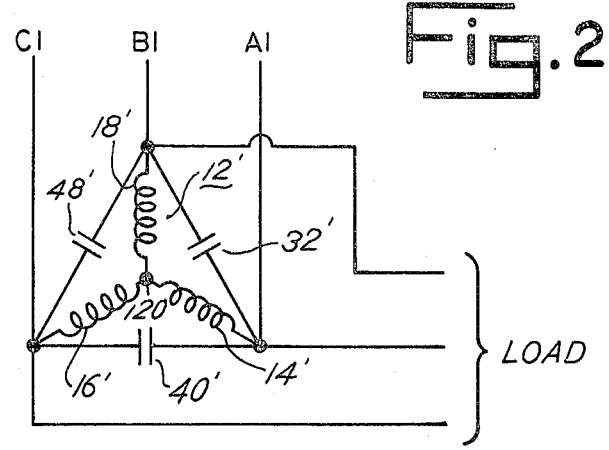
FIG. 2 is a schematic diagram of a modified form or portion of the system shown in FIG. 1.
Figure 3:
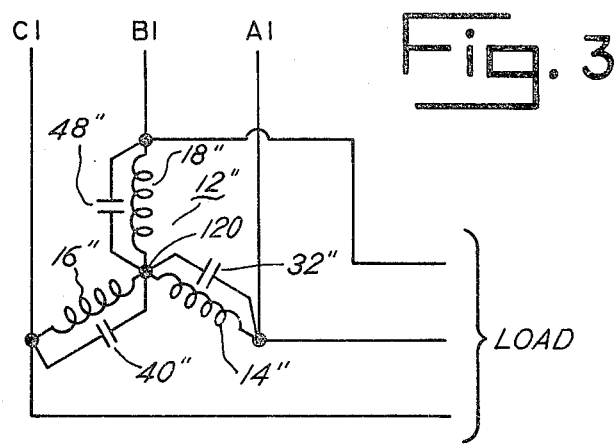
FIG. 3 is a schematic diagram of a further modified form or portion of the system shown in FIG. 1.
Figure 4:
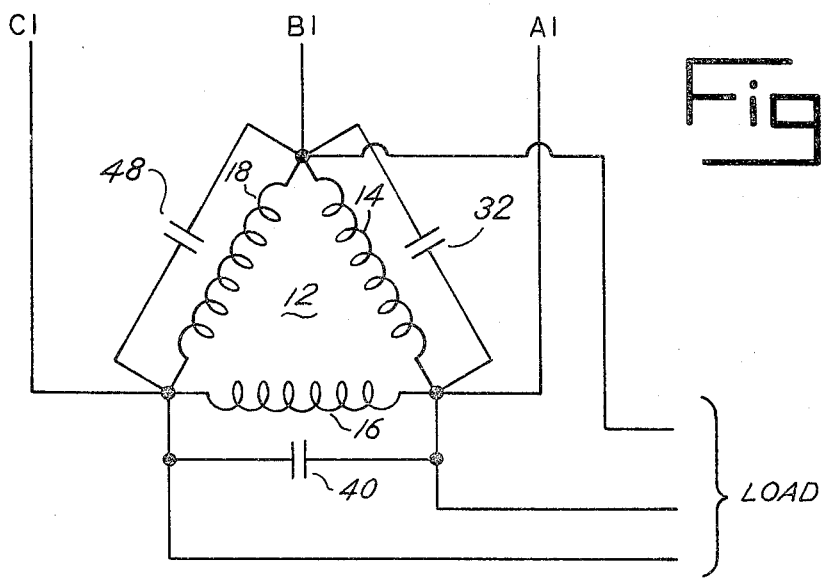
FIG. 4 is a schematic diagram of a portion of the system shown in FIG. 1, illustrating a variation in the use and form of the invention.

In the pilot motor assemblies shown in the embodiment of FIGS. 2 and 3, the motors identified by numerals 12' and 12" are in wye connection with windings 14' and 16' and 18' or 14", 16" and 18", and FIG. 4 is the delta connection similar to that shown in FIG. 1, with windings 14, 16 and 18. The operation and function of the various parts in the embodiments of these three figures are essentially the same, irrespective of the winding connections. In these embodiments, the capacitors may be either the low m.f.d. capacitors 30, 38 and 46, and hence function to minimize or eliminate spikes and other transients in the main supply lines, or they may be the high m.f.d. capacitors 32, 40 and 48, and hence function, not only to minimize or eliminate spikes and other transients in the main supply lines, but also function as phase converters in the event the current is interrupted in any one of the three main supply lines. The systems of FIGS. 2, 3 and 4 as described herein in either the wye or delta connected arrangement, may be used apart from the circuits A4, B4 and C4, which provide the short or by-pass around one of the low m.f.d. capacitors. In the diagrams of these figures, only one capacitor is shown in each of the three lines connecting terminals A2, B2, and C2, and the grounds of the wye connected windings are identified by numeral 120 in FIGS. 2 and 3. The primary advantage of the by-pass circuitry, which is not present in the simplified modifications of FIGS. 2, 3 and 4, is to permit the use of low and high m.f.d. capacitors in the system to minimize or eliminate spikes and other transients by economical means, and at the same time provide an emergency system in the event the power is lost in any of the three main supply lines.

While three embodiments of the present polyphase electrical system have been described herein, various changes and modifications may be made without departing from the scope of the present invention.

I claim:

1. A regulating device for three phase electrical circuits having three main supply lines of different phases, said device having phase conversion and transient suppression capabilities, comprising a motor having three windings of different phases corresponding to the phases of the main supply lines, leads for connecting said windings to said main supply lines, lead means arranged in parallel with the windings of said motor, terminals for connecting said lead means with respective windings, a relatively low m.f.d. capacitor and a relatively high m.f.d. capacitor in each of said lead means, a by-pass circuit for each of said supply lines connected to separate said lead means on opposite sides of the respective low m.f.d. capacitor with one connection therof being between said capacitors, and relay means disposed in each by-pass circuit and being responsive to the current in the respective supply line for closing the respective circuit to by-pass the low m.f.d. capacitor in the respective lead means and to render said high m.f.d. capacitor operable when the current in the respective main supply line is interrupted.

2. A regulating device for polyphase electrical circuits as defined in claim 1, in which said relay means disposed in each of said by-pass circuits is of the potential relay type in which the switch thereof is retained in open position by the current in the respective supply line.

3. A regulating device for polyphase electrical circuits as defined in claim 1, in which said windings of said motor are connected in a delta arrangement.

4. A regulating device for polyphase electrical circuits as defined in claim 1, in which said windings of said motor are connected in a wye arrangement.

5. A regulating device for polyphase electrical circuits having a plurality of main supply lines of different phases, said device comprising a motor having a plurality of windings of phases correspondng to the phases of said main supply lines, leads connecting said windings to said main supply lines, lead means arranged in parallel with the windings of said motor and connected at terminals therewith, a relatively low m.f.d. capacitor and a relatively high m.f.d. capacitor in each of the lead means, by-pass circuits connected to each of said lead means on opposite sides of the respective low m.f.d. capacitor with one connection thereof being between said capacitors, and relay means disposed in each of said by-pass circuits and being responsive to the current in the separate supply lines for closing the respective circuit to by-pass the respective low m.f.d. capacitor when the current in the respective main supply line is interrupted.

6. A regulating device for polyphase electrical circuits as defined in claim 5, in which said relay means disposed in each of said by-pass circuits is of the potential relay type in which the switch thereof is retained in open position by the current in the respective supply line.

7. A regulating device for polyphase electrical circuits as defined in claim 5, in which said windings of said motor are connected in a delta arrangement.

8. A regulating device for polyphase electrical circuits as defined in claim 5, in which said windings of said motor are connected in a wye arrangement.

9. A regulating device for polyphse electrical circuits having a plurality of main lines of different phases for supplying current to a load, said device comprising a pilot motor having a plurality of windings of phases corresponding to the phases of said main supply lines, end terminals for said windings, leads for connecting said windings to the main supply lines, lead means arranged in parallel with each of the windings and connected therewith at their terminals, and a capacitor in each of said lead means for suppressing transients in the respective main supply lines.

10. A regulating device for polyphase electrical circuits as defined in claim 9, in which said capacitors are of a m.f.d. rating sufficient to cause any one of said capacitors to function as a phase converter in the event the current is interrupted in the respective main supply line.

11. A regulating device for polyphase electrical circuits as defined in claim 9, in which said windings of said motor are connected in a delta arrangement.

12. A regulating device for polyphase electrical circuits as defined in claim 9, in which said windings of said motor are connected in a wye arrangement.

* * * * *